(12) United States Patent
Jang

(10) Patent No.: US 9,600,853 B2
(45) Date of Patent: Mar. 21, 2017

(54) METHOD, TERMINAL AND SYSTEM FOR IMAGE PROCESSING

(71) Applicant: SAMSUNG ELECTRONICS CO., LTD., Suwon-si (KR)

(72) Inventor: Sung-kyu Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 14/542,738

(22) Filed: Nov. 17, 2014

(65) Prior Publication Data

US 2015/0161755 A1 Jun. 11, 2015

(30) Foreign Application Priority Data

Dec. 11, 2013 (KR) ........................ 10-2013-0154103

(51) Int. Cl.
*G06T 1/00* (2006.01)
*G06T 1/20* (2006.01)

(52) U.S. Cl.
CPC ..................................... *G06T 1/20* (2013.01)

(58) Field of Classification Search
CPC ......... H04N 1/00244; H04N 2201/001; H04N 2201/0039; H04N 2201/325; H04N 2007/145; G06F 9/5044; G06F 9/505; G06F 3/122; G09G 2350/00
See application file for complete search history.

(56) References Cited

U.S. PATENT DOCUMENTS

| 7,788,596 B2 | 8/2010 | Iwabuchi |
| 2005/0146621 A1* | 7/2005 | Tanaka .............. H04N 1/00127 348/211.2 |
| 2007/0188621 A1 | 8/2007 | Kitagawa |
| 2010/0277508 A1 | 11/2010 | Takahashi |
| 2012/0054730 A1 | 3/2012 | Michishita |
| 2012/0059867 A1* | 3/2012 | Okamori .............. G06F 9/5044 709/201 |
| 2012/0150881 A1 | 6/2012 | Cho et al. |
| 2012/0194542 A1 | 8/2012 | Matsui et al. |
| 2012/0236159 A1 | 9/2012 | Tamura |
| 2013/0335582 A1* | 12/2013 | Itasaki .................... G06F 3/005 348/207.1 |

FOREIGN PATENT DOCUMENTS

| JP | 2007-221452 A | 8/2007 |
| JP | 2012-195901 A | 10/2012 |
| KR | 10-2007-0101328 A | 10/2007 |
| KR | 10-2013-0039059 A | 4/2013 |
| WO | 2006/081225 A2 | 8/2006 |

* cited by examiner

*Primary Examiner* — Hau Nguyen
(74) *Attorney, Agent, or Firm* — Sughrue Mion, PLLC

(57) ABSTRACT

Provided are a cloud server-based image processing method performed by an image processing terminal, and the image processing terminal and system therefor. The method includes determining whether an image processing function is to be performed by the image processing terminal or a server; and controlling at least one of the image processing terminal and the server to perform the image processing function, based on a result of the determining. When it is determined that the image processing function is to be performed by the server, data and a request signal related to the image processing function are transmitted to the server.

25 Claims, 12 Drawing Sheets

METHOD, TERMINAL AND SYSTEM FOR IMAGE PROCESSING

CROSS REFERENCE TO RELATED APPLICATION

This application claims priority from Korean Patent Application No. 10-2013-0154103, filed on Dec. 11, 2013 in the Korean Intellectual Property Office, the disclosure of which is incorporated herein in its entirety by reference.

BACKGROUND

1. Field

One or more exemplary embodiments relate to a cloud server-based image processing method performed by an image processing terminal, and the image processing terminal and system therefor.

2. Description of Related Art

With advances in communication technology, an image captured using a terminal having an image shooting function may be uploaded and stored in a cloud server.

However, in the related art, an image captured using a terminal is simply uploaded to a cloud server and downloaded from the cloud server. Thus, the quality of the captured image is determined by the performance of the terminal.

Thus, even if an image captured by a low-performance terminal is displayed on a high-performance terminal using a cloud system, the image is displayed based on the performance capabilities of the low-performance terminal.

Also, the higher the performance of a terminal, the more expensive the terminal. Thus, it may be inefficient to produce image processing terminals including a high-cost and high-performance processor in consideration of the speed of technology development.

SUMMARY

One or more exemplary embodiments include an image processing method, terminal, and system capable of providing images that are image-processed in various ways in association with a cloud server.

Thus, a system including an actual terminal that has relatively low throughput or processing power but can be driven in real time and a cloud server that is limited in the speed of data transmission via a network but has higher throughput or processing power than the throughput of the actual terminal may be configured as one virtual terminal. Also, the functions of the virtual terminal may be performed in a distributed manner, based on the throughputs or processing power of the actual terminal and the cloud server, thereby efficiently capturing and viewing an image.

Additional aspects will be set forth in part in the description which follows and, in part, will be apparent from the description, or may be learned by practice of the presented exemplary embodiments.

According to an aspect of an exemplary embodiment, there is provided a server-based image processing method performed by an image processing terminal, including determining whether an image processing function is to be performed by the image processing terminal or a server, and controlling at least one of the image processing terminal and the server to perform the image processing function, based on a result of the determining, wherein, in response to determining that the image processing function is to be performed by the server, data and a request signal related to the image processing function are transmitted to the server.

The server-based image processing method may include determining a processing performance of the image processing terminal, and determining whether the image processing function is to be performed by the image processing terminal or the server, according to the determined processing performance of the image processing terminal.

The server-based image processing method may include comparing an expected processing time of the image processing terminal and an expected processing time of the server with respect to the image processing function, and determining whether the image processing function is to be performed by the image processing terminal or the server, based on a result of the comparing.

The server-based image processing method may include in response to the image processing function being a function of processing an image to have a first resolution, determining that the function is to be performed by the image processing terminal, and in response to the image processing function being a function of processing an image to have a second resolution that is higher than the first resolution, determining that the function is to be performed by the server.

The server-based image processing method may include in response to the image processing function being a function of processing the data into multiple image files having various resolutions, determining that the function is to be performed by the server.

The request signal may include information indicating whether the image processing function is to be performed in real time.

The data may include full-resolution raw image data or region-of-interest data.

The server-based image processing method may include in response to the image processing function being a function of displaying a screen-nail image, determining that the function is to be performed by the image processing terminal, and in response to the image processing function being a function of transmitting a zoom region of the displayed screen-nail image to the image processing terminal, determining that the function is to be performed by the server.

The server-based image processing method may include receiving processed image data from the server.

The server-based image processing method may include in response to the image processing function being a function of sharing an image stored in the image processing terminal with another device, determining that the function is to be performed by the image processing terminal, and in response to the image processing function being a function of sharing an image stored in the server with an other device, determining that the function is to be performed by the server.

The server-based image processing method may include in response to the image processing function being the function of sharing an image stored in the server with the other device, controlling the server to perform the function of sharing the image stored in the server with the other device.

The server-based image processing method may include controlling of at least one of the image processing terminal and the server to perform the image processing function comprises controlling the image processing terminal and the server to encode a video through temporal or spatial scalability.

The server-based image processing method may include in response to the image processing function being a function of encoding information having a first resolution, determining that the function is to be performed by the image processing terminal, and in response to the image processing function being a function of encoding information having a second resolution that is higher than the first resolution, determining that the function is to be performed by the server.

The controlling of at least one of the image processing terminal and the server to perform the image processing function may include controlling at least one of the image processing terminal and the server to decode the encoded video through temporal or spatial scalability.

According to an aspect of another exemplary embodiment there is provided a server-based image processing terminal including a determination unit configured to determine whether an image processing function is to be performed by an image processing terminal or a server, and a controller configured to control at least one of the image processing terminal and the server to perform the image processing function, based on a result of the determination by the determination unit and in response to the determination unit determining that the image processing function is to be performed by the server, transmit data and a request signal related to the image processing function to the server.

The determination unit may determine a processing performance of the image processing terminal, and determine whether the image processing function is to be performed by the image processing terminal or the server, according to the determined processing performance of the image processing terminal.

The determination may compare an expected processing time of the image processing terminal and an expected processing time of the server with respect to the image processing function, and determine whether the image processing function is to be performed by the image processing terminal or the server, based on a result of the comparison, and the server may be connected to the image processing terminal via a network.

The determination unit may in response to the image processing function being a function of processing an image to have a first resolution, determine that the function is to be performed by the image processing terminal, and in response to the image processing function being a function of processing an image to have a second resolution that is higher than the first resolution, determine that the function is to be performed by the server.

According to an aspect of another exemplary embodiment there is provided a server-based image processing system including an image processing terminal including a determination unit configured to determine whether an image processing function is to be performed by the image processing terminal or a server, and a controller configured to transmit data and a request signal related to the image processing function to the server in response to a determination by the determination unit that the image processing function is to be performed by the server, and a cloud server configured to receive the data and the related signal and perform the image processing function that is to be performed based on the server.

According to an aspect of another exemplary embodiment there is provided an image processing method including obtaining by a terminal raw image data having a raw image data resolution, processing by the terminal the raw image data into a locally processed image, transmitting the raw image data and an advanced processing request from the terminal to the server, and receiving a portion of a remotely processed image corresponding to the transmitted raw image data from the server via the established communication link.

The image processing method may further include estimating a local processing time for the terminal to fulfill the advanced processing request, estimating a remote processing time for the server to fulfill the advanced processing request, and determining, based on the local processing time and the remote processing time, whether to perform the advanced processing locally on the terminal or remotely on the server.

The remote processing time may include a network transmission time and a network receiving time.

The locally processed image may be a thumbnail image having a thumbnail resolution, and the remotely processed image may be a full-resolution image having the raw image data resolution.

The advanced processing request may be at least one of noise reduction, gamma correction, color filter array interpolation, color correction, color enhancement, which balance control, brightness smoothing, and color shading.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
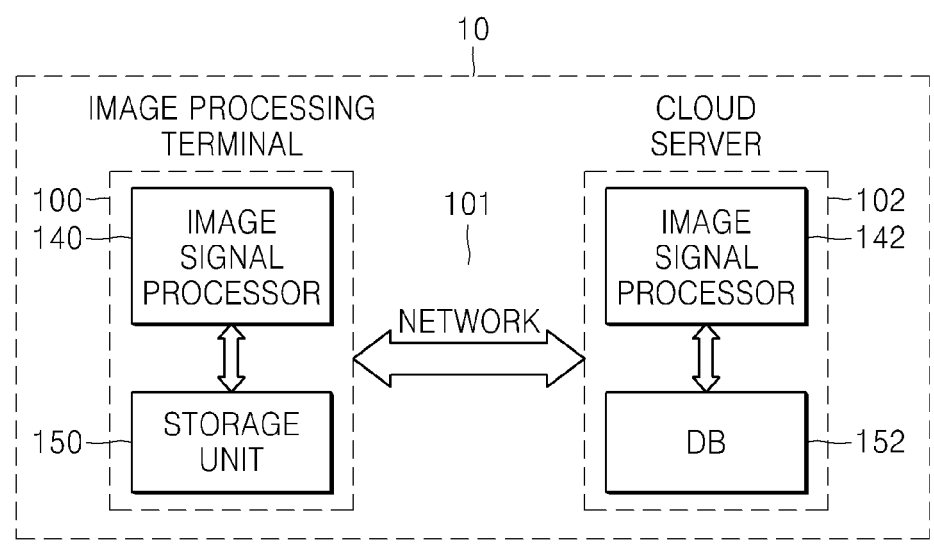
FIG. 1 is a schematic block diagram of a server-based image processing system according to an exemplary embodiment.

Hereinafter, exemplary embodiment will be described in greater detail. In the present disclosure, a term such as "unit" and "module" means a unit in which at least one function or operation is processed, and may be embodied in a hardware manner, a software manner, or a combination of the hardware and the software manners.

In the present disclosure, "one exemplary embodiment" or "exemplary embodiment" means particular properties, structures, features, etc. that are included in and described using at least one exemplary embodiment. Thus, expressions "in one exemplary embodiment" or "in the exemplary embodiment" throughout the present disclosure do not always indicate the same exemplary embodiment.

In the exemplary embodiments set forth herein, general terms that have been widely used are chosen in consideration of functions described in these exemplary embodiments. However, terms may be chosen based on technicians' intentions in this art, precedents, or the advent of new technology. In some cases, terms may be arbitrarily chosen by the present applicant. In this case, the meanings of the terms will be explained in detail herein. Accordingly, the terms used in these exemplary embodiments should be defined based on the meanings thereof and the context.

In the exemplary embodiments set forth herein, the terms "communication", "communication network", and "network" may be used interchangeably with one another. These terms may refer to wired or wireless, short-distance or wide-area data networks, via which data can be exchanged between an image processing terminal and a cloud server.

In the exemplary embodiments set forth herein, the term "cloud server" may mean a server computer that a client accesses to receive a cloud computing service (hereinafter referred to as a 'cloud service'). Here, the "cloud service" means a computing environment in which information is stored on a server. The information is temporarily stored on a client which may access the cloud service. The client may be an information technology (IT) device such as a digital photographing device, a tablet, a personal computer (PC), a computer, a laptop computer, a net book, a smart phone, etc. That is, the "cloud service" can conceptually be considered as storing information on a server and allowing a user to use the information via various IT devices, regardless of time and location. In other words, the "cloud service" may mean a computing service whereby users can borrow desired computing resources (e.g., hardware/software resources), i.e., technology whereby computing resources present at physically different locations are integrated and provided through virtualization technology. In some exemplary embodiments, the server may be connected to the Internet, in other exemplary embodiments, a fee may be required for use of various cloud services.

In the exemplary embodiments set forth herein, an image processing terminal may be embodied in various forms. Examples of the image processing terminal described in the present disclosure include a digital camera, a mobile phone, a smart phone, a laptop computer, a tablet PC, an e-book terminal, a digital broadcasting terminal, a personal digital assistant (PDA), a portable multimedia player (PMP), and a navigation system, but are not limited thereto.

In the exemplary embodiments set forth herein, an image may be indicated as having a resolution of nM (n Megapixels), 'n' denoting a value indicating a total number of pixels of the image. For example, a resolution of 2 M may represent a resolution of 1920×1080, a resolution of 4 M may represent a resolution of 2560×1440, and a resolution of 8 M represents an ultra-high definition (UHD), e.g., a resolution of 3840×2160. Here, '2 M', '4 M', and '8 M' correspond to values that approximate the total numbers of pixels in images having various resolutions. Thus, it would be apparent to those of ordinary skill in the art that the resolution of 2 M, the resolution of 8 M, the resolution of nM, etc. are not limited to combinations of horizontal and vertical sizes of images and may represent horizontal sizes among combinations of arbitrary horizontal and vertical sizes.

Reference will now be made in detail to exemplary embodiments illustrated in the accompanying drawings, wherein like reference numerals refer to like elements throughout. In this regard, the exemplary embodiments may have different forms and should not be construed as being limited to the descriptions set forth herein. For convenience of explanation, parts that are not necessary to explain the present disclosure are not described herein. Accordingly, the exemplary embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a schematic block diagram of a server-based image processing system 10 according to an exemplary embodiment.

Referring to FIG. 1, the server-based image processing system (hereinafter referred to as the 'system') 10 according to an exemplary embodiment, may include an image processing terminal (hereinafter referred to as the 'terminal') 100, the cloud server 102, and a wired/wireless network 101 enabling the terminal 100 and the cloud server 102 to communicate with each other. The terminal 100 may include an image signal processor 140 configured to perform image signal processing, and a storage unit 150 configured to store signal-processed data. The cloud server 102 may include an image signal processor 142 and a database (DB) 152 to perform server-based image processing.

Referring to FIG. 1, according to an exemplary embodiment, the system may be configured as one virtual terminal including the terminal 100 and the cloud server 102. The terminal 100 has low throughput or processing power, but is capable of driving image processing in real time according to user input. The terminal 100 transmits data via the network 101. The cloud server 102 receives data via the network 101, but is limited by the speed of data transmission. The cloud server 102 has higher throughput or processing power than that of the terminal 100. Thus, in the virtual terminal, image processing may be performed using both the terminal 100, and the cloud server 102 in a distributed manner. Therefore, various images (e.g., still images, videos, etc.) may be more efficiently captured and viewed on the terminal 100.

That is, image processing operations that have been independently performed using a terminal are functionally classified and optimally mapped to one of the terminal 100 and the cloud server 102 by using one virtual terminal. Thereby, the need to separately operate different image processing devices (e.g., the terminal 100 and the cloud server 102) is eliminated and therefore, terminal performance can be maximized. For example, if a maximum resolution of an image that the terminal 100 can process is limited to, e.g., 8 M or less, the complexity and costs of the terminal 100 may be decreased. However, a user may still be capable of processing an image having a resolution higher than the maximum resolution of an image that the terminal 100 can process (e.g., images having a resolution of 16 M or 32 M) by using the cloud server 102. Thereby obtaining a desired result without increased complexity and costs.

Figure 2:
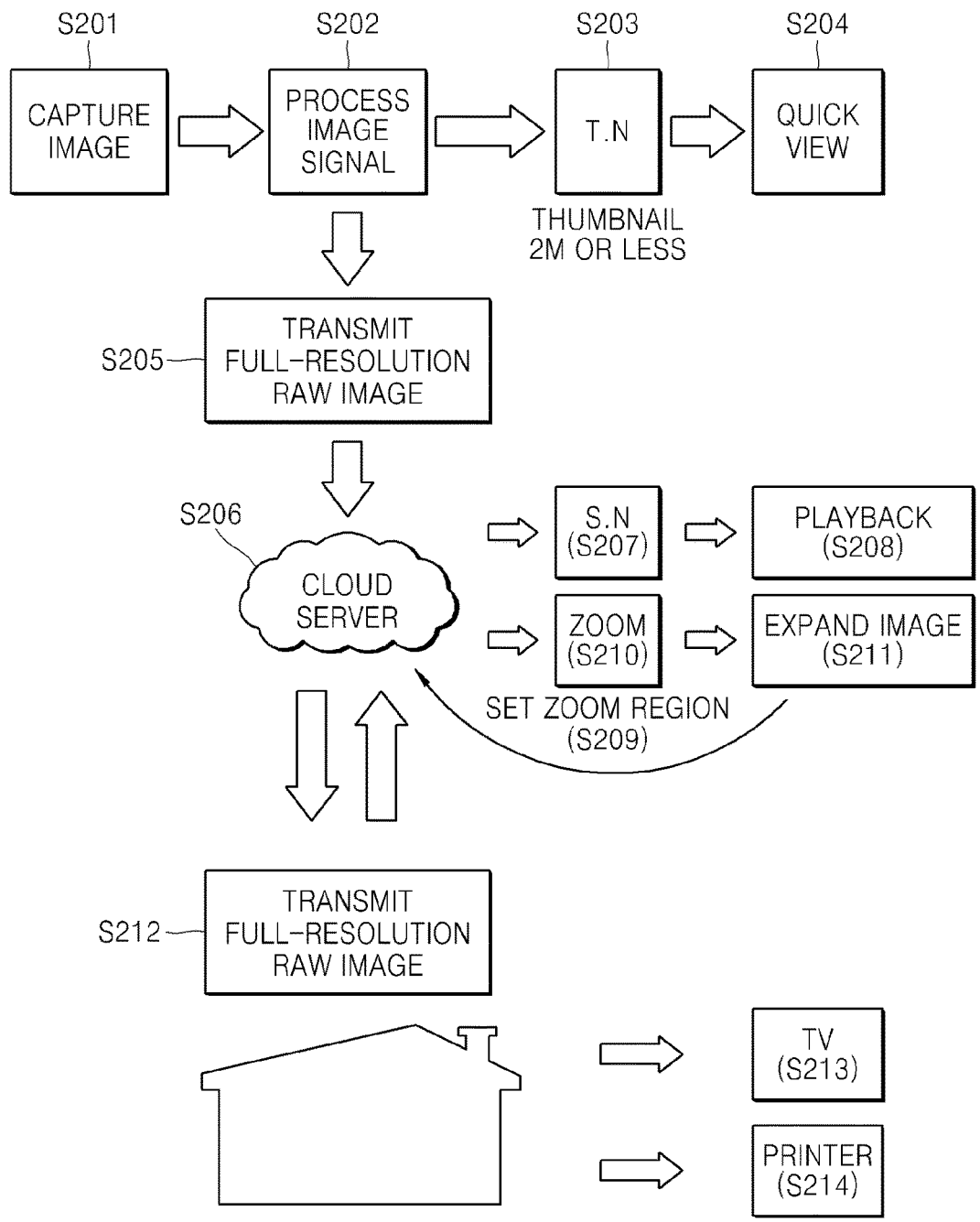
FIG. 2 is a conceptual diagram of a server-based image processing method according to an exemplary embodiment.

FIG. 2 is a conceptual diagram of a server-based image processing method according to an exemplary embodiment.

Referring to FIGS. 1 and 2, the terminal 100, according to an exemplary embodiment, may capture an image (operation S201) and perform image signal processing on the captured image using the image signal processor 140 (operation S202) to obtain image data having a desired resolution. Here, the image signal processing may improve the quality of captured raw image data, provide a special effect on the captured raw image data, or perform a series of operations to produce image data compressed according to predetermined compression standards (e.g., Joint Photographic Experts Group (JPEG) standards).

In detail, when a user targets an object in a live view, and then pushes a shutter to a half-pushed position (however, the shutters of some devices may not be capable of being pushed to the half-pushed position) or performs a touch gesture, the terminal 100 may perform an adjustment, i.e., auto exposure (AE)/auto white balance (AWB)/auto focus (AF). Then, the terminal 100 may capture an image according to the user input, and obtain a full-resolution image (operation S201).

Next, image-signal processing may be performed on the full-resolution image (operation S202), and a thumbnail image may be produced by compressing the resultant image into an image having a predetermined resolution, e.g., 2 M or less (operation S203). The thumbnail image may be quickly viewed on a display of the terminal 100 (operation S204). For the quick view, the image processing needs to be performed and thus an image having a resolution that is lower than that of the full-resolution image is used as the thumbnail image.

In general, if terminal 100 is not connected to the cloud server 102, the terminal 100 will process the full-resolution image into a compressed full-resolution image, or an image having a resolution that is higher than that of a quick-view image while the quick-view image is displayed thereon. In this case, the resultant image may not be immediately displayed, and may be stored in a JPEG, or other compressed image form.

However, compressing higher resolution images requires longer processing time. Furthermore, the terminal 100 may not be able to process an image having a resolution that is equal to or higher than a predetermined resolution (e.g., 8 M) due to hardware performance limitations.

Thus, the image signal processor 140 of the terminal 100, according to exemplary embodiments, may process the full-resolution image data into a thumbnail resolution image, (e.g., 2 M) and transmit the full-resolution raw image to the cloud server 102 (operation S205). The cloud server 102 may then process the full-resolution raw image (operation S206). As another example, the terminal 100 may process the thumbnail image and the full-resolution raw image, and the cloud server 102 may process images having different resolutions. That is, the cloud server 102 may receive full-resolution raw data, and generate, from the full-resolution raw data, compressed images having various resolutions. The cloud server 102 is not influenced by terminal resources, and is thus capable of producing compressed image data by individually processing, for example, images having a resolution of 2 M, 8 M, 16 M, and/or 32 M.

In a playback mode in which a captured image is viewed on the display of the terminal 100, the terminal 100 performs image processing, for example, by reading a compressed or non-compressed image stored in the storage unit 150, decoding the read image, and displaying the decoded image. In this case, the higher the resolution of the image to be decoded, the longer a time required to decode the image. Thus, in general, the terminal 100 may produce and store a screen-nail image having a lower resolution than that of the raw image captured during the image shooting mode. Here, the screen-nail image may be the same as a thumbnail image described above, but is not limited thereto.

Accordingly, the terminal 100 may store a screen-nail image, corresponding to a captured image in a local storage unit as described above (operation S207), and rapidly display the stored screen-nail image, even in the playback mode (operation S208).

If a user sets and expands a region of the screen-nail image that is being viewed as a zoom region, image quality may be greatly degraded if the zoom region of the screen-nail image is simply expanded. Thus, in one exemplary embodiment, when the zoom region is set according to user input (operation S209), the cloud server 102 may transmit an expanded region of a high-resolution image, corresponding to the expanded region, to the terminal 100 (operation S210).

Thus, the terminal 100 may display the expanded region received from the cloud server 102 (operation S211). Accordingly, even if a high-resolution image is not actually stored in the storage unit 150, an image that is rapidly expanded without degrading the quality thereof may be displayed to a user in the playback mode.

In one exemplary embodiment, the full-resolution raw image is stored in the DB 152 of the cloud server 102, and may be transmitted to a plurality of devices and systems connected to the cloud server 102 (operation S212). For example, an image having a resolution corresponding to that of the transmitted full-resolution raw image may be displayed on a television (TV) (operation S213), or be output via a printer (operation S214).

A cloud server-based image processing method performed using an image processing terminal will be described in detail with reference to FIGS. 3 to 14 below.

Figure 3:
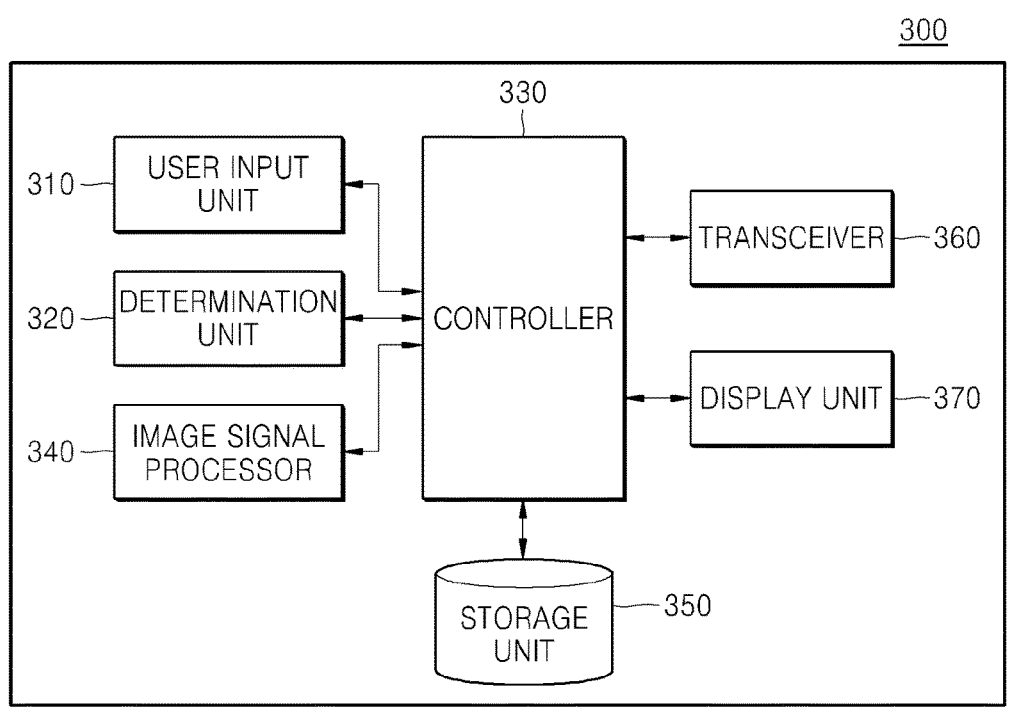
FIG. 3 is a block diagram of a server-based image processing terminal according to an exemplary embodiment.

FIG. 3 is a block diagram of a server-based image processing terminal 300 according to an exemplary embodiment.

Referring to FIG. 3, a terminal 300 according to an exemplary embodiment may include a user input unit 310, a determination unit 320, a controller 330, an image signal processor 340, a storage unit 350, a transceiver 360, and a display unit 370.

For convenience of explanation, only elements of the terminal 300 that are related to the current exemplary embodiment are illustrated in FIG. 3. However, it would be apparent to those of ordinary skill in the art that the terminal 300 may further include other general elements. The terminal 300 of FIG. 3 may correspond to the terminal 100 of FIG. 1 and may be thus connected to a cloud server (hereinafter referred to as the 'the cloud server 102') via a network.

In one exemplary embodiment, the user input unit 310 may include one or more of a touch panel, key buttons, as well as various other input devices for manipulating the terminal 300 based on user input. For example, a user may set an operating mode of the terminal 300, via the user input unit 310, to be a general shooting mode, a video shooting mode, a playback mode, a sharing mode, or the like. Also, a zoom instructing signal may be received, via the user input unit 310, in the playback mode.

In one exemplary embodiment, the determination unit 320 may determine whether an image processing function is to be performed by the terminal 300 or the cloud server 102. Examples of an image processing function performed in the shooting mode or the playback mode will be described below when describing an operation of image signal processor 330.

In one exemplary embodiment, the determination unit 320 may determine a processing performance of the terminal 300, and, according to the determined processing performance, determine whether the image processing function is to be performed using the terminal 300 or the cloud server 102, as will be described with reference to FIGS. 6 to 9 below.

In another exemplary embodiment, the determination unit 320 may compare an expected processing time of the terminal 300 with an expected processing time of the cloud server 102, and determine, according to a result of the comparison, whether the image processing function is to be performed using the terminal 300 or the cloud server 102. Here, the expected processing time of the cloud server 102 may be determined in consideration of both a processing speed of the cloud server 102, and a time required to transmit/receive data via the network. A method of determining whether the image processing function is to be performed by the terminal 300 or the cloud server 102, according to the processing speeds of the network and the terminal 300 according to an embodiment will be described with reference to FIG. 10 below.

In one exemplary embodiment, the controller 330 may control at least one of the terminal 300 and the cloud server 102 to perform the image processing function, according to a determination of the determination unit 320.

In detail, the controller 330 may control the image signal processor 340 to perform a function. Also, in order to perform a function on the cloud server 102, the controller 330 may transmit data, and a request signal related to the function, to the cloud server 102. Here, the function to be performed on the cloud server 102 may require higher hardware performance, or a larger amount of calculation than a function to be performed using the terminal 300.

Thus, the function to be performed using the terminal 300 may be a function of processing an image having a predetermined resolution, and the function to be performed based on the cloud server 102 may be a function of processing an image having a higher resolution than the predetermined resolution of an image to be processed by the terminal 300. For example, the controller 330 may control the terminal 300 to process only images having the same resolution as a thumbnail image (e.g., a resolution of 2 M), transmit the full-resolution raw data to the cloud server 102, and control the cloud server 102 to process the full-resolution raw data. Here, the image having the predetermined resolution may be used in a function of a live view, AE, AWB, AF, a quick view, etc.

As another example, the terminal 300 may be controlled to process thumbnail images and full-resolution images, and the cloud server 102 may be controlled to process various images having different resolutions. That is, the cloud server 102 may process high-resolution images requiring high performance or a large amount of process time, while the terminal 300 may process low-resolution images that may be processed rapidly.

Furthermore, operation of the cloud server 102 is not influenced by processing conditions of the terminal 300, and may thus individually process the full-resolution raw data into, for example, images having a resolution of 2 M, 8 M, 16 M, or 32 M to obtain compressed image data.

In one exemplary embodiment, the request signal may contain information indicating if a function performed on the cloud server 102 is to be performed in real time. For example, when only thumbnail images are displayed in a quick view on the terminal 300, an image processing function of, for example, removing noise from a full-resolution image or compressing the full-resolution image, may be performed using the cloud server 102 in non-real time. Thus, an operation to be performed in non-real time using the cloud server 102, may be determined without considering the speed of the network.

Furthermore, in one exemplary embodiment, the controller 330 may control the user input unit 310, the determination unit 320, the image signal processor 340, the storage unit 350, the transceiver 360, and the display unit 370 such that the terminal 300 may perform server-based image processing.

In one exemplary embodiment, the image signal processor 340 may perform a special function on an image data signal processed by an analog signal processor 121 (not shown). For example, the image signal processor 340 may perform image-signal processing to improve the quality of input image data. For example, a special effect may be applied to the input image data, e.g., noise reduction, gamma correction, color filter array interpolation, a color matrix, color correction, color enhancement, white balance control, brightness smoothing, and color shading. The image signal processor 340 may generate an image file by compressing input image data and restore image data from the image file. An image compression format may be a reversible format or an irreversible format. As an example of an appropriate format, a JPEG (Joint Photographic Experts Group) format or a JPEG 2000 format may be used in the case of a still image. When a video is recorded, a video file may be produced by compressing a plurality of frames according to MPEG (Moving Picture Experts Group) standards.

The image signal processor 340 may produce a video file. The image signal processor 340 obtains frames to be included in the video file by capturing a video, encodes the frames, for example, according to the MPEG4 (Moving Picture Experts Group 4) standards, the H.264/Advanced Video Coding (AVC) standards, or the WMV (windows media video) standards to compress the video, and produces the video file from the compressed video. The video file may be produced in various formats such as an mpg format, an mp4 format, a Third Generation Partnership Project (3gpp) format, an Audio Video Interleave (avi) format, an Advanced Streaming Format (asf) format, a mov format, etc.

Also, the image signal processor 340 may perform sharpening, color enhancement, blurring, edge enhancement, image interpretation, image recognition, image effect processing, etc. on input image data. The image recognition may include face recognition, scene recognition, etc. In one exemplary embodiment, when high processing performance is required, such as when sharpening, color enhancement, blurring, edge enhancement, image interpretation, image recognition, image effect processing, etc., is to be performed, image data may be transmitted to the cloud server 102. Thereafter, the image-processing may be performed by the cloud server 102.

Furthermore, the image signal processor 340 may process an image signal to be displayed on the display unit 370. For example, the image signal processor 340 may perform brightness level adjustment, color correction, contrast control, edge enhancement, image division, generation of a character image, image composition, etc.

In one exemplary embodiment, the storage unit 350 may store an image file. The storage unit 350 may be configured using a non-volatile storage medium, such as a hard disk drive (HDD) or a flash memory, which is capable of storing digital data. For example, the storage unit 350 may store compressed or uncompressed image or video files.

In one exemplary embodiment, the transceiver 360 may include a network interface card (NIC) or a modem, and be configured to enable data to be exchanged between terminal 300 and the cloud server 102.

In one exemplary embodiment, the display unit 370 may include a unit for visually displaying an image on a liquid crystal display (LCD) or a light-emitting diode (LED) module. On the display unit 370, a quick view and a screen-nail image may be displayed under control of the controller 170. When the display unit 370 is configured as a touch panel, the display unit 370 may perform an operation together with the user input unit 310.

Figure 4:
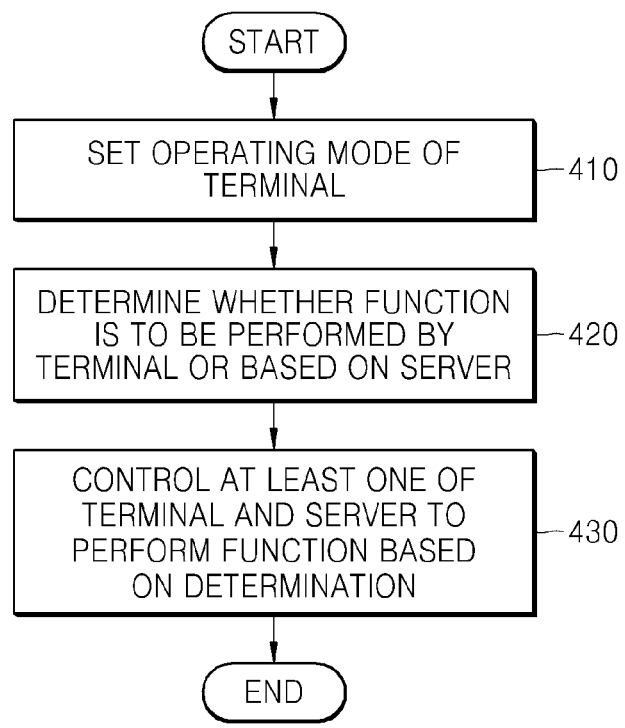
FIG. 4 is a flowchart of a server-based image processing method according to an exemplary embodiment.

FIG. 4 is a flowchart of a server-based image processing method according to an exemplary embodiment of the present disclosure.

Referring to FIG. 4, an image processing method, performed using the terminal 100 or 300, and the cloud server 102, includes operations to be sequentially performed using the image processing system 10 or the terminal 100 or 300 illustrated in FIG. 1 or 3. Thus, although not described below, the above description of the image processing system 10 or one of the terminal 100 and the terminal 300 illustrated in FIGS. 1 and 3 may also apply to the method of FIG. 4.

Referring to FIG. 4, in operation S410, an operating mode of the terminal 300 may be set to be the shooting mode, the video shooting mode, the playback mode, or the sharing mode, according to user input. For example, the image shooting mode may be set to correspond to an operation of turning on the terminal 300.

In operation 420, the determination unit 320 may determine whether an image processing function performed in the operating mode of the terminal 300 is to be performed using the terminal 300 or based on the cloud server 102.

In one exemplary embodiment, the determination unit 320 may determine a processing performance of the terminal 300, and based on the determined processing performance, determine whether the image processing function is to be performed using the terminal 300 or based on the cloud server 102. A method of determining whether the image processing function is to be performed using the terminal 300 or based on the cloud server 102 according to the processing performance of the terminal 300, according to exemplary embodiments will be described with reference to FIGS. 6 to 9 below.

In another exemplary embodiment, the determination unit 320 may compare, for a particular image processing function, an expected processing time of the terminal 300 with an expected processing time of the cloud server 102, and determine whether the image processing function is to be performed using the terminal 300 or based on the cloud server 102 according to a result of the comparison. Here, the expected processing time of the cloud server 102 may be based on both the processing speed of the cloud server 102 and a time required to transmit/receive data via the network. A method of determining whether a function is to be performed using the terminal 300 based on the processing speeds of the network and the terminal 300 or is to be performed based on the cloud server 102 according to an exemplary embodiment will be described with reference to FIG. 10 below.

In operation 430, the controller 330 may control at least one of the terminal 300 and the cloud server 102 to perform the function, based on the determination of the determination unit 320. The controller 330 may control the image signal processor 340 to perform a function on the terminal 300. Also, when a function is performed based on the cloud server 102, the controller 330 may transmit data and a request signal related to the function to the cloud server 102.

A server-based image processing method, performed in the image shooting mode, according to exemplary embodiments of the present disclosure will be described with reference to FIGS. 5 to 10 below.

Referring to FIGS. 5 to 10, an image processing method may be performed using an image processing terminal 500 and a cloud server 502. The method may include operations to be sequentially performed using the image processing system 10, the terminal 100 or 300, or the cloud server 102 illustrated in FIG. 1 or 3. Thus, although not described below, the above descriptions of the image processing system 10, the terminals 100 and 300, and the cloud server 102 illustrated in FIGS. 1 and 3 selectively apply to the methods of FIGS. 5 to 10.

Figure 5:
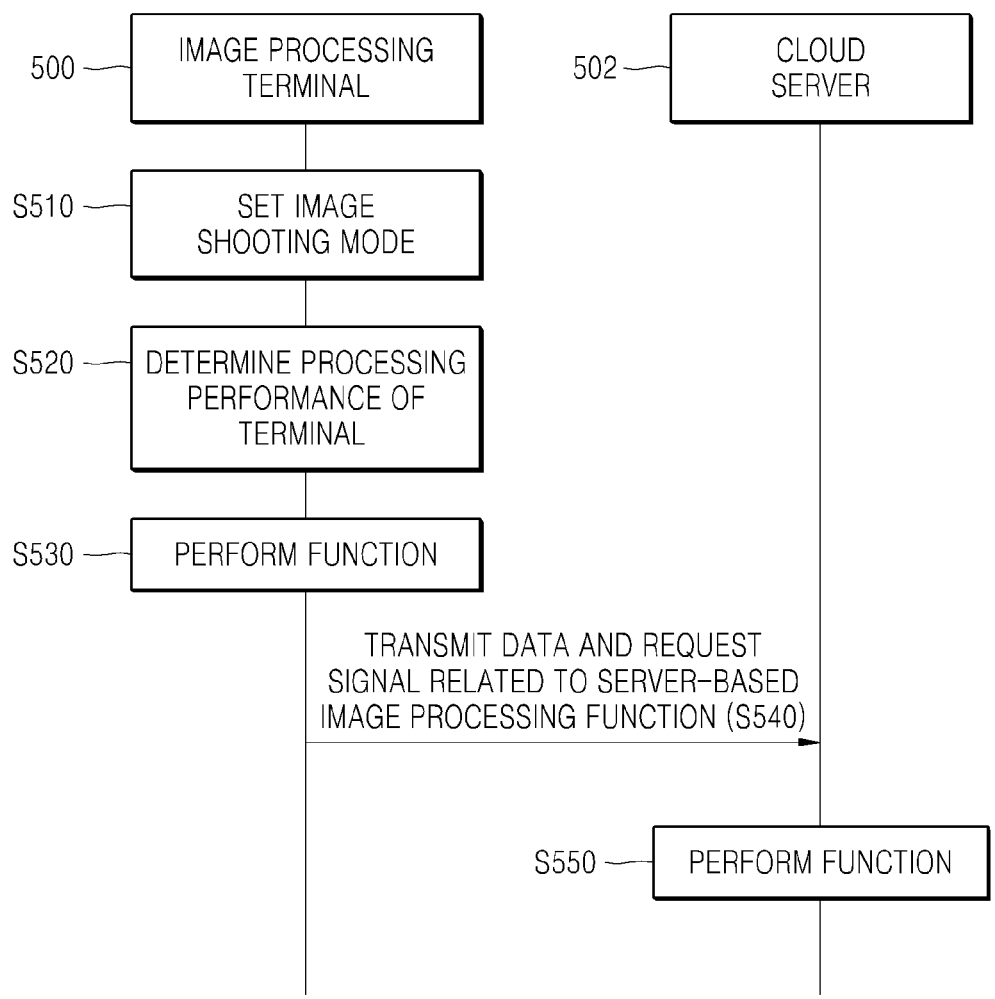
FIG. 5 is a flowchart of a server-based image processing method performed in an image shooting mode according to an exemplary embodiment.

FIG. 5 is a flowchart of an image processing method performed based on the cloud server 502 in the image shooting mode of the terminal 500 according to an exemplary embodiment.

In operation S510, the terminal 500 may set an operating mode thereof to be the image shooting mode according to user input. Otherwise, the operating mode of the terminal 500 may be set to a continuous shooting mode or a video shooting mode.

In one exemplary embodiment, in operation S520, the terminal 500 may determine whether an image processing function is to be performed using the terminal 500 or the cloud server 502.

Methods of determining a function is to be performed using the terminal 500, or the cloud server 502, according to a processing performance of the terminal 500 according to exemplary embodiments will be described with reference to FIGS. 6 to 9 below. A method of determining whether a function is to be performed using the terminal 500, or the cloud server 502 according to processing speeds of both a network and the terminal 500, according to another exemplary embodiment will be described with reference to FIG. 10 below.

In operation S530, if it is determined in operation S520 that the image processing function is to be performed using the terminal 500, the image processing function may be performed using the terminal 500.

In operation S540, if it is determined in operation S520 that the image processing function is to be performed based on the cloud server 102, data and a request signal related to the image processing function may be transmitted to the cloud server 102. Here, the data may be a full-resolution raw image. The request signal may include information regarding whether the image processing function is to be performed in real time or not, and the type of the image processing function to be performed on the cloud server 102.

In operation S550, the cloud server 502 may receive the data and the request signal related to the image processing function to be performed, and perform the image processing function.

Alternatively, operations S530 to S550 may not be performed in the order described above, and may be performed in a different order, based on whether or not the image processing function needs to be performed in real time.

For example, when the terminal 500 performs a quick view by processing a thumbnail image of a captured image, a full-resolution raw image need not be compressed simultaneously with the performing of the quick view, and may be image-processed by the cloud server 502 in non-real time. That is, after the quick view is performed, the terminal 500 should additionally use resources to compress the full-resolution raw image and may thus transmit the full-resolution raw image to the cloud server 502 so that the full-resolution raw image may be compressed by the cloud server 502. Furthermore, even if the terminal 500 provides a function of compressing the captured image into an image having a resolution that is less than or equal to a predetermined resolution (e.g., a resolution of 8 M or less), the full-resolution raw image may be transmitted to the cloud server 102 to be compressed and stored in various resolutions.

In some exemplary embodiments, uploading a full-resolution image to the cloud server 502 via a network may be a heavy burden. In this case only a particular region-of-interest (ROI) (e.g., a face region) of the full-resolution image may be uploaded. A number of the ROI is not limited, and a plurality of ROIs may be uploaded.

Also, image processing and image file management may be performed by separately uploading a full-resolution image and an image having a different resolution from that of a thumbnail image to the cloud server 502. For example, when the terminal 500 is capable of capturing an image having a full resolution of 20 M, the terminal 500 may process the captured data into an image having a resolution of 2 M for a quick view or to store this image, and upload an image having a resolution of 8 M to the cloud server 502 to process the captured data into a compressed image having a resolution of 8 M.

Figure 6:
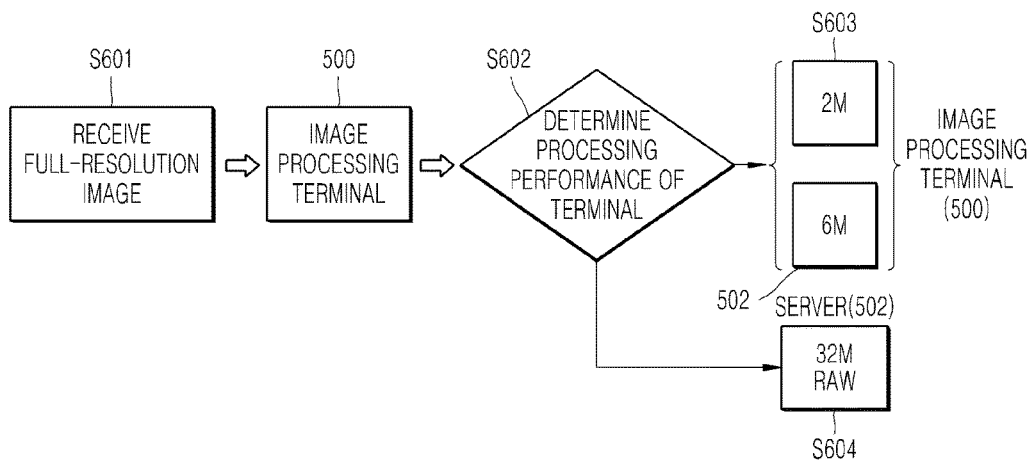
FIG. 6 is a block diagram of a server-based image processing method performed in the image shooting mode according to an embodiment.

FIG. 6 is a block diagram for explaining a server-based image processing method performed in the image shooting mode according to an exemplary embodiment.

Referring to FIG. 6, in operation S601, a full-resolution image may be received using an image processing terminal 500. For example, the full-resolution image may be an image having a resolution of 32 M, and an image having a resolution of 32 M may be captured and input in the shooting mode.

In operation S602, the terminal 500 may determine a processing performance thereof and determine whether a function is to be performed using the terminal 500 itself or to be performed on the cloud server 102. For example, in operation S603, if the maximum resolution of an image that the terminal 500 is capable of processing is 6 M, and the terminal 500 captures a raw image having a resolution of 32 M, the terminal 500 may develop an image having a resolution of 2 M or a different resolution that is equal to or less than 6 M. In operation S604, a raw image having a resolution of 32 M may be transmitted to and developed by the cloud server 502. That is, the terminal 500 may develop low-resolution images for a quick view, and the cloud server 502 may develop high-resolution images.

Figure 7:
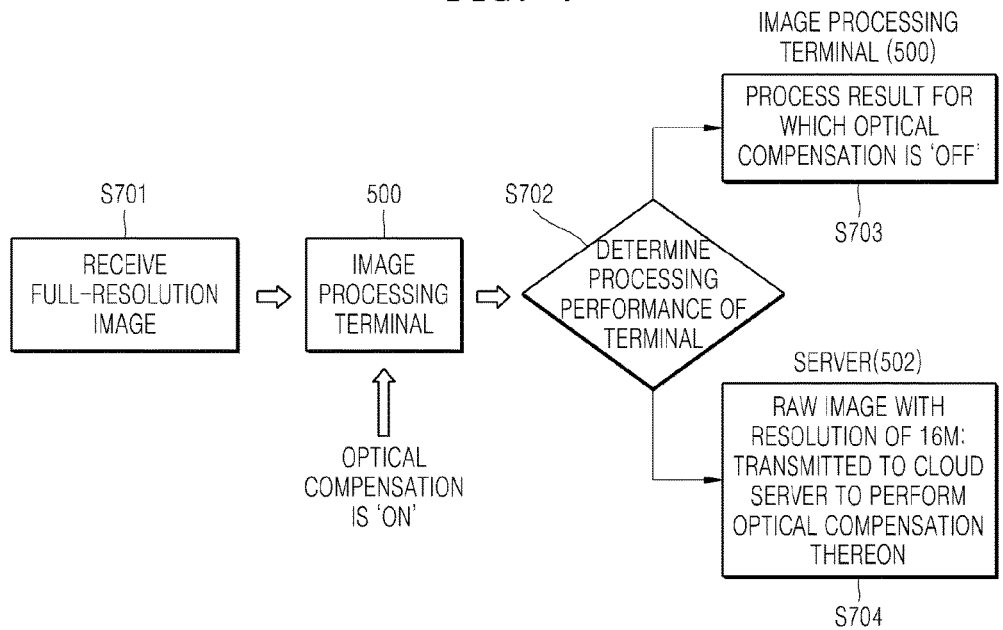
FIG. 7 is a flowchart of a server-based image processing method performed in the image shooting mode according to another exemplary embodiment.

FIG. 7 is a flowchart of a server-based image processing method performed in the image shooting mode according to another exemplary embodiment.

Referring to FIG. 7, in operation S701, a full-resolution image may be received using the terminal 500. For example, the full-resolution image may be an image having a resolution of 16 M, and may be a captured image or a stored image. In this case, an image processing function may be set and performed according to user input. For example, the terminal 500 may be set to perform optical correction, super-resolution optical compensation, super-resolution image processing, high-sensitivity noise reduction, etc. in the shooting mode. However, these operations require high hardware performance, and a long processing time, therefore the terminal 500 may not be capable of performing these operations.

Then, in operation S702, the terminal 500 may determine a processing performance thereof and determine whether a function is to be performed using the terminal 500 itself or on a cloud server 502.

For example, in operation S703, when the terminal 500 is not capable of performing optical compensation and the optical compensation is turned 'on' by a user, the terminal 500 may process a result for which optical compensation is 'off'. In operation S704, a raw image having a resolution of 16 M may be transmitted to the cloud server 502 and the cloud server 502 may thereafter perform an optical compensation function. However, the present disclosure is not limited thereto and super-resolution image processing, high-sensitivity noise reduction, etc. that requires high hardware performance may be performed by the cloud server 502.

Figure 8:
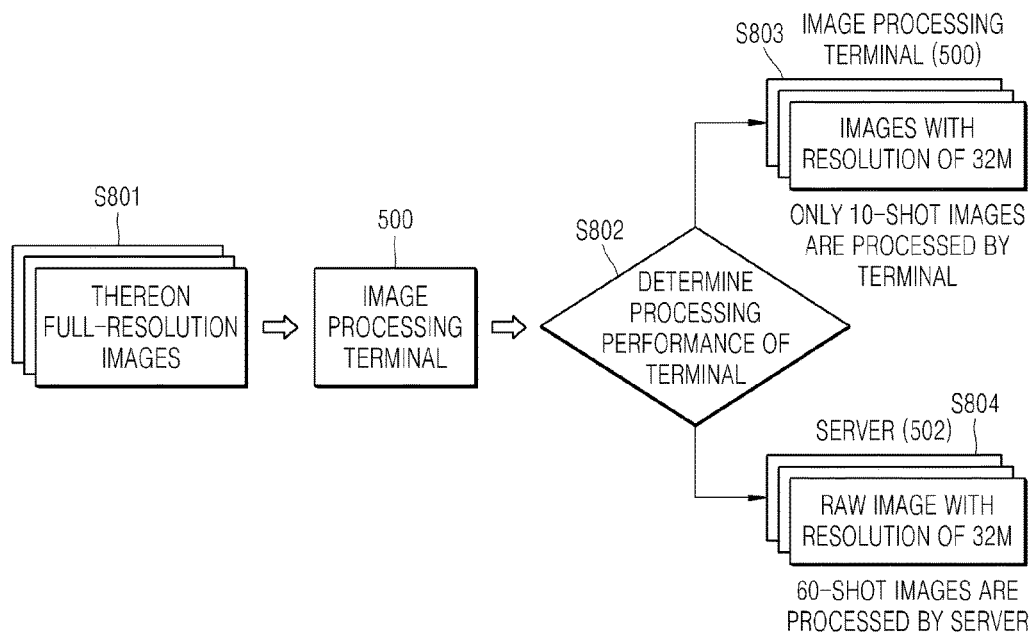
FIG. 8 is a block diagram of a server-based image processing method performed in a continuous shooting mode according to another exemplary embodiment.

FIG. 8 is a block diagram for explaining a server-based image processing method performed in a continuous shooting mode according to another exemplary embodiment.

Referring to FIG. 8, in operation S801, the terminal 500 may capture full-resolution images at a speed of 60 shots per second. In operation S802, a terminal 500 may determine a processing performance thereof. Based on the determination, it is determined whether a function is to be performed using the terminal 500 or on a cloud server 502. In operation S803, if the terminal 500 is capable of processing, for example, images having a full-resolution of 32 M at a speed of less than 10 shots per second, the terminal 500 may process a first one of the full-resolution images having a resolution of 32 M. In operation S804, a raw image corresponding to the first one of the full-resolution images having a resolution of 32 M is transmitted to the cloud server 502. Thereafter, the remaining images captured by the terminal 500, at a speed of 60 shots per second, having a resolution of 32 M, are transmitted to the cloud server 502. That is, the cloud server 502 is capable of developing a larger number of images than the terminal 500.

Figure 9:
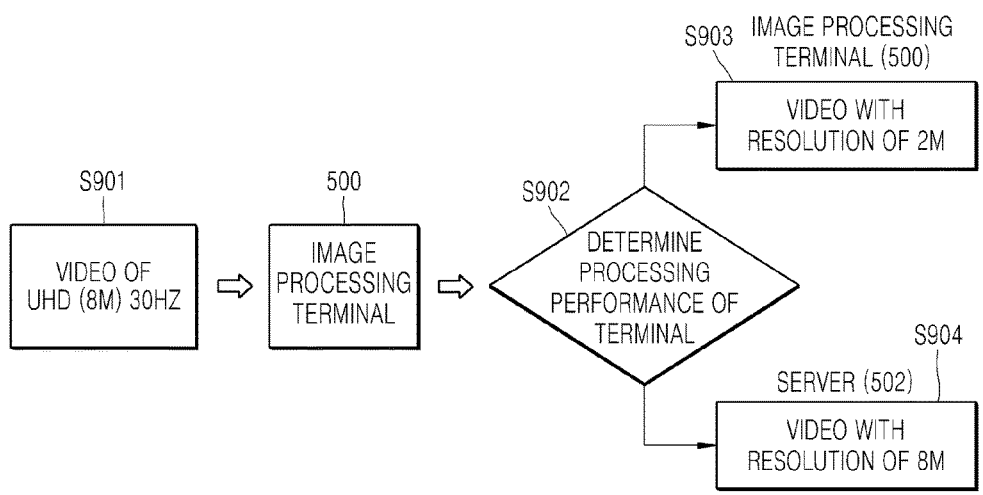
FIG. 9 is a block diagram of a server-based image processing method performed in a video shooting mode according to an embodiment.

FIG. 9 is a block diagram for explaining a server-based image processing method performed in a video shooting mode according to an exemplary embodiment.

Referring to FIG. 9, in operation S901, a video having a UHD of 8 M and a frame speed of 30 Hz may be captured by the terminal 500.

In operation S902, the terminal 500 may determine a processing performance thereof and, based on the determined performance, determine whether a function is to be performed using the terminal 500 or on the cloud server 102. In operation S903, if the terminal 500 is capable of processing videos having a resolution of 2 M and a frame speed of 30 Hz or less, the terminal 500 may process videos having a resolution of 2 M and a frame speed of 30 Hz. In operation S904, a raw video having a resolution of 8 M and a frame speed of 30 Hz may be transmitted to the cloud server 502 and processed, similar to an image having a full resolution of 8 M, by the cloud server 502. That is, videos may be captured similar to still images. In other words, the resolution of a video processed by and displayed on the terminal 500, and the resolution of a video processed by and stored in the cloud server 502, may be different from each other. Also, the terminal 500 and the cloud server 502 may process videos at different points of time. However, if the video data is not directly transmitted to the cloud server 502, the amount of video data that can be transmitted to and stored in the cloud server 102 may be limited due to a limited storage space of the terminal 500. Also, when stored data is directly transmitted to the cloud server 502 via a network, a large amount of video data is to be transmitted. Thus, in some exemplary embodiments, temporal/spatial scalability may be applied between the terminal 500 and the cloud server 502. That is, a standard/non-standard method may be used. In one example, it is assumed that a video can be received in a UHD of 8 M and at a frame speed of 30 Hz. In this case, the terminal 500 is capable of processing only a video having a resolution of 2 M and a frame speed of 30 Hz or less according to the H.264 standards. In this case, the difference between the 2 M video data and the 8 M video data (which may be obtained by, for example, expanding the resolution of 2 M and subtracting a result of expanding the resolution of 2 M from the resolution of 8 M) may be separately compressed through spatial scalability, temporarily stored in the terminal 500, transmitted to the cloud server 502 in a space with a sufficient network bandwidth (e.g., a Wi-Fi environment in a household), and thereafter decoded and combined with the raw moving image to produce a video of UHD 30 Hz. Here, the difference may be compressed, for example, in an image file such as a JPEG format or the like. Otherwise, a DPCM (differential pulse code modulation) format, which is another way to compress information, may be used. Similarly, through temporal scalability, some video data may be decoded at a frame speed of 15 Hz by the terminal 500, and the other data may be simply compressed, temporarily stored, and encoded at a full frame speed of 30 Hz by the cloud server 502.

Furthermore, when video standards are used, a video may be compressed according to the H.264 standards by the terminal 500, and may be then transcoded, compressed again according to the H.265 High Efficiency Video Coding (HEVC) standards, and transmitted to another display device by the cloud server 502.

Figure 10:
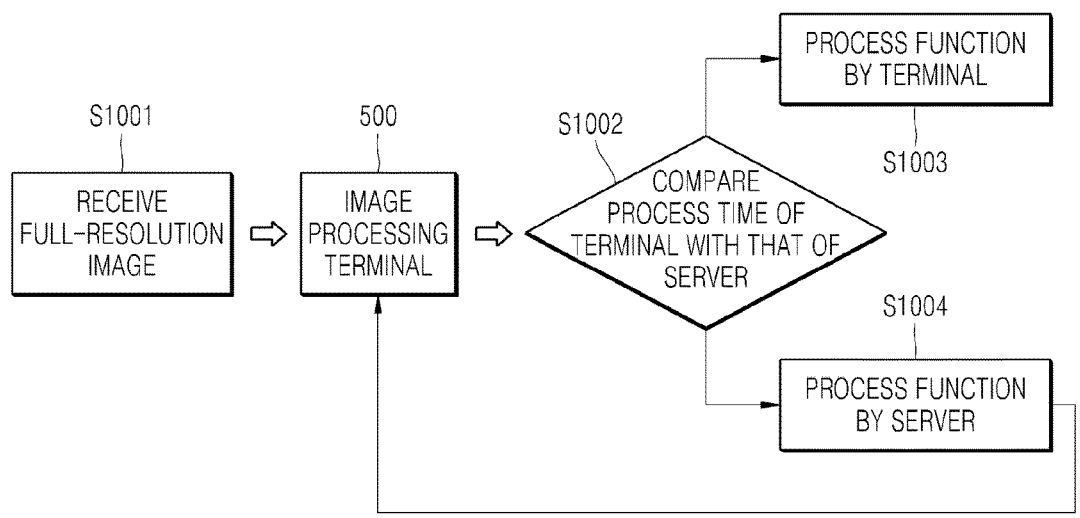
FIG. 10 is a block diagram of a server-based image processing method performed in consideration of a process time of a terminal according to an exemplary embodiment.

FIG. 10 is a block diagram for explaining a server-based image processing method performed in consideration of a process time of a terminal according to an exemplary embodiment.

Referring to FIG. 10, in operation S1001, a full-resolution image may be input via a terminal 500. For example, the full-resolution image may be an image having a resolution of 32 M that is captured in the shooting mode.

In operation S1002, the terminal 500 may compare an expected processing time thereof with that of the cloud server 102 connected thereto via a network, and determine, according to a result of the comparison, whether an image processing function is to be performed using the terminal 500 or on the cloud server 502. Here, the expected processing time of the cloud server 502 may consider both a processing speed of the cloud server 502 and a time required to transmit/receive data via the network.

For example, in operation S1003, even if an expected time to process a function on the cloud server 502 is shorter than an expected time to process the function on the terminal 500, the terminal may still decide to process the function. This occurs when the time for the terminal 500 to process the function is shorter than the time required to both process the function on the cloud server 502 and exchange data between the terminal 500 and the cloud server 502 via the network. In operation S1004, if the speed of the network is high and the function may be performed faster using the cloud server 502 than by the terminal 500, the cloud server 502 may process the function.

In particular, since it takes a considerably long time to transmit a high-resolution image from the terminal 500 to the cloud server 502, the terminal 500 may perform basic image processing (e.g., image compression, AE, AWB, etc,) on a high-resolution image, such as an image having a resolution of 20 M, and the cloud server 502 may perform image processing requiring high performance (e.g., noise reduction, etc.) on a low-resolution image, such as an image having a resolution of 4 M.

However, the exemplary embodiment of FIG. 10 corresponds to a case in which real-time processing is required, and an expected processing time may not be considered when functions of the terminal 500 and the cloud server 502 are individually performed in non-real time as described above with reference to FIGS. 6 to 9, e.g., when the terminal 500 displays quick-view images and the cloud server 502 stores images having a higher resolution than the quick-view image.

Exemplary methods of determining whether a function is to be processed by the terminal 300 or the cloud server 102, according to processing speeds of the network and the terminal 300, will be described below.

Figure 11:
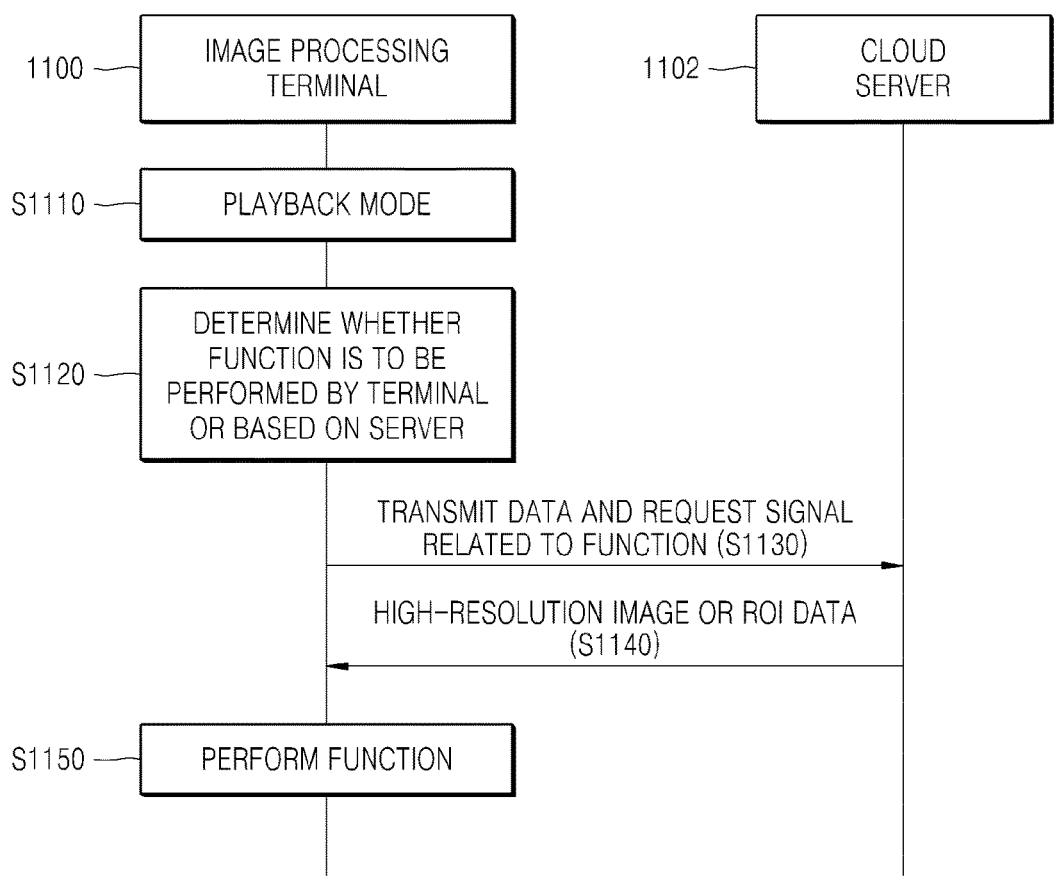
FIG. 11 is a flowchart of a server-based image processing method performed in a playback mode according to an exemplary embodiment.

FIG. 11 is a flowchart of a server-based image processing method performed in a playback mode, according to an exemplary embodiment.

Referring to FIG. 11, an image processing method performed on a cloud server 1102 in the playback mode includes operations to be sequentially performed using the image processing system 10 or the terminal 100 or 300 illustrated in FIG. 1 or 3. Thus, although not described below, the above description of the image processing system 10 or the terminal 100 or 300 illustrated in FIG. 1 or 3 also applies to the method of FIG. 11.

In one exemplary embodiment, in operation S1110, an image processing terminal 1100 may set an operating mode thereof to be the playback mode, according to user input.

Generally in the playback mode, in which a captured image is viewed on a display unit of the terminal 1100, the terminal 1100 reads a stored compressed or non-compressed image, performs image processing, e.g., decoding, and then displays a resultant image. The higher the resolution of the image to be decoded, the longer a processing time may be. In general, the terminal 1100 may thus separately produce and store a screen-nail image having a lower resolution.

Thus, the terminal 1100, according to an exemplary embodiment, stores only a screen-nail image of a captured image, and may thus rapidly display the screen-nail image, even in the playback mode as described above.

However, if the screen-nail image having a low resolution is simply expanded, image quality may be greatly degraded. Thus, when a user desires to set and expand a region of the screen-nail image, as a zoom region, the user may additionally receive and display data of the zoom region. In this case, the data of the zoom region may be read from the terminal 1100 or received from the cloud server 1102.

In one exemplary embodiment, in operation S1120, the terminal 1100 may determine whether an image processing function performed in the playback mode is to be performed using the terminal 1100 or the cloud server 1102. For example, displaying of an image having the same resolution as the screen-nail may be performed using the terminal 1100. However, when a full-resolution image, or an image having a resolution that is higher than that of an image stored in the terminal 1100 needs to be displayed, an image stored in the cloud server 1102 may be received. In particular, when the image displayed on the terminal 1100 is zoomed, the image stored in the server 1102 may be instead received and displayed on the terminal 1100, thereby preventing image quality from being degraded.

A method of determining whether a function is to be performed by the terminal 500 or the cloud server 502, according to a processing performance of the terminal 500, has been described above with reference to FIGS. 6 to 9. Also, a method of determining whether a function is to be performed by the terminal 500 or the cloud server 502, according to processing speeds of a network and the terminal 500, has been described above with reference to FIG. 10.

In operation S1130, if it is determined in operation S1120 that the function is to be performed on the cloud server 1102, data and a request signal related to the function may be transmitted to the cloud server 1102. In operation S1140, an image having a higher resolution than the image stored in the terminal 1100, or an ROI image may be received from the server 1102. Here, since it takes a considerable time to receive a high-resolution image via the network, the ROI image may be received and used to perform a zoom operation, thereby the time required for transmitting/receiving data.

In operation S1150, the function may be performed on the cloud server 1102, according to the determination performed in operation S1120. For example, the zoom operation may be performed in the playback mode in which a captured image is viewed.

Figure 12:
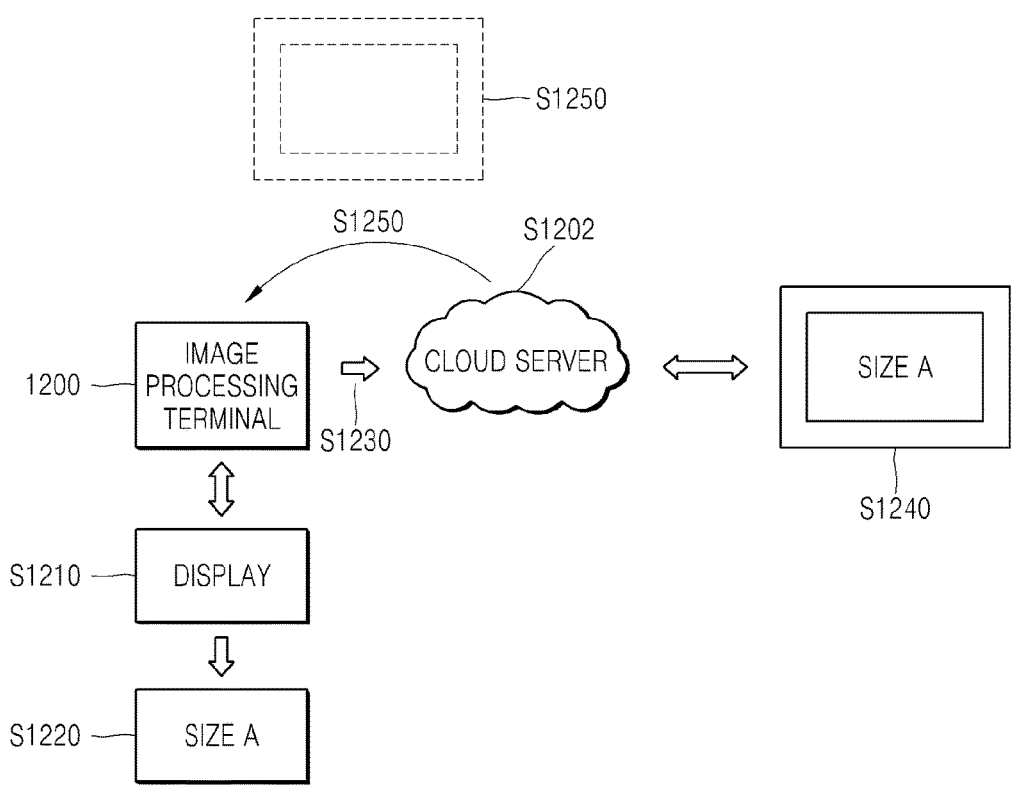
FIG. 12 is a block diagram of a server-based image processing method performed in the playback mode according to an exemplary embodiment.

FIG. 12 is a block diagram illustrating a server-based image processing method, performed in the playback mode, according to an exemplary embodiment.

Referring to FIG. 12, in operation S1210, a desired image may be displayed on an image processing terminal 1200 in the playback mode.

In operation S1220, a zoom operation may be performed according to user input.

In operation S1230, when image data of a region of the image to be zoomed, through the zoom operation, needs to be received from the cloud server 1202, the terminal 1200 may request the cloud server 1202 to provide the image data of the region.

In operation S1240, the cloud server 1202 may determine the data requested by the terminal 1200. For example, the cloud server 1202 may detect an image having a higher resolution than that of the image stored in the terminal 1200, and transmit the data of the region selected from the detected image to the terminal 1200.

In operation S1250, the terminal 1200 may receive the data of the region from the cloud server 1202. In this case, the terminal 1200 may receive only the data of the region, e.g., data of a ROI, from the cloud server 1202.

Figure 13:
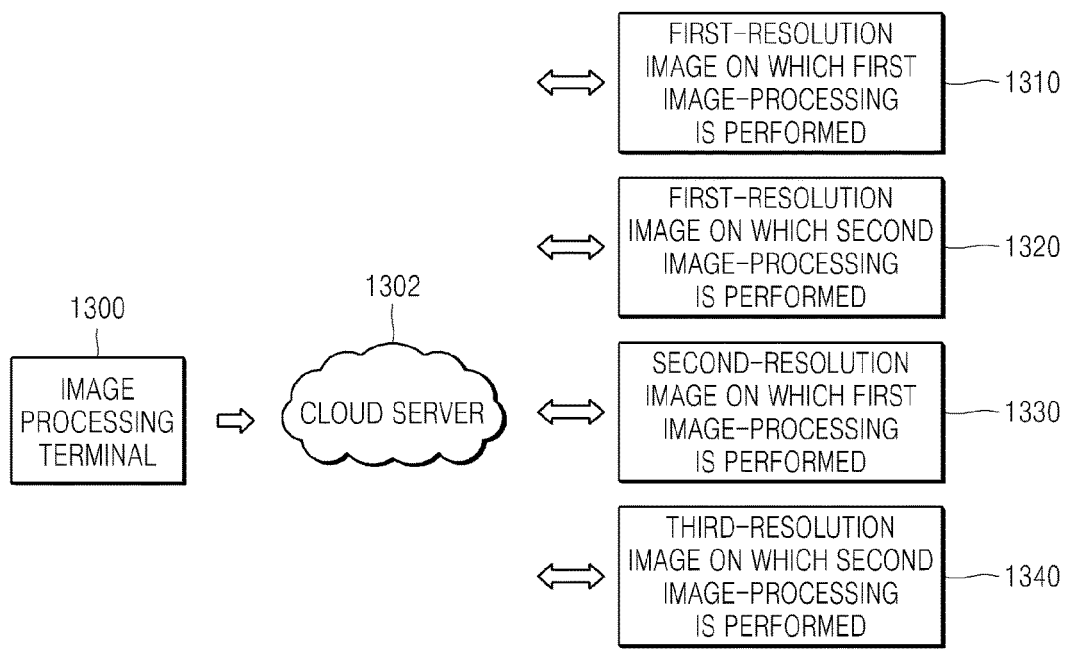
FIG. 13 is a block diagram of a server-based image processing method performed in the playback mode according to another embodiment.

FIG. 13 is a block diagram for explaining a server-based image processing method performed in the playback mode, according to another exemplary embodiment.

Referring to FIG. 13, in one exemplary embodiment, a cloud server 1302 may beforehand produce not only a full-resolution image but also images 1310, 1320, 1330, and 1340 that have at least one resolution and are image-processed in various ways. In particular, the images 1310, 1320, 1330, and 1340 may have different resolutions, and be image-processed differently. For example, the images 1310 and 1320 may have a first resolution, e.g., 8 M, the image 1330 may have a second resolution, e.g., 16 M, and the image 1340 may have a third resolution, e.g., 32 M. Also, first image processing, e.g., noise reduction, may be performed on the images 1310 and 1330, and second image processing, e.g., image stabilization, may be performed on the images 1320 and 1340.

Thus, when an image processing terminal 1300 requests the cloud server 1302 to provide an image that has a predetermined resolution and on which predetermined image processing is performed, the cloud server 1302 may directly transmit the image to the terminal 1300 via a network without performing additional image-processing.

In order to view information processed in a distributed manner, a plurality of image formats, information regarding a plurality of image sizes, ROI, and image sets that are image-processed differently, may be stored in the terminal 1300 or the server 1302, and optimal image information may be provided according to a user's selection.

Also, information regarding the size of a display to which an image is output, or color space information, may be received beforehand from the terminal 1300 or the cloud server 1302, and an optimal image may be selected on the terminal 1300 based on this information.

Figure 14:
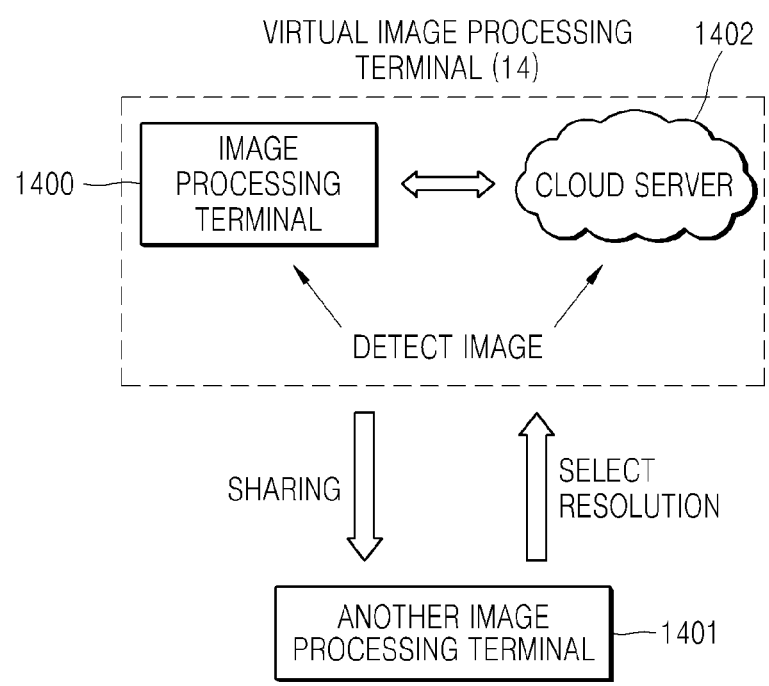
FIG. 14 is a block diagram of a server-based image processing method performed in an image sharing mode according to another embodiment.

FIG. 14 is a block diagram for explaining a server-based image processing method performed in an image sharing mode according to another exemplary embodiment.

Referring to FIG. 14, a virtual image processing terminal 14 according to an exemplary embodiment may include at least one image processing terminal 1400, and a cloud server 1402 connected to the at least one image processing terminal 1400 via a network.

The virtual image processing terminal 14 may be connected to another image processing terminal 1401 via the network and share image data with the other image processing terminal 1401. In this case, the virtual image processing terminal 14, according to an exemplary embodiment, may store various image data in the at least one image processing terminal 1400 or the cloud server 1402 in a distributed manner. Thus, in one exemplary embodiment, when the other image processing terminal 1401 requests the virtual image processing terminal 14 to provide an image, the virtual image processing terminal 14 may search the at least one image processing terminal 1400 or the cloud server 1402 for the requested image, and efficiently share the requested image with the other image processing terminal 1401. For example, when the at least one image processing terminal 1400 shares a relatively low resolution image with the other image processing terminal 1401 in the proximity thereof, an image stored in the at least one image processing terminal 1400 may be directly transmitted to the other image processing terminal 1401. However, when the other image processing terminal 1401 requests a large amount of a high-resolution image, the at least one image processing terminal 1400 may search the cloud server 1402 for the image and transmit the image to the other image processing terminal 1401.

There may be various combinations of such a sharing concept according to an exemplary embodiment. For example, a push concept and a pull concept may be combined, so that when another user borrows an image belonging to a user ('pull') or the user provides his/her image to the other user ('push'), an image that is optimal in terms of image size, resolution, and image processing may be used on various locations (e.g., the at least one image processing terminal 1400 and the cloud server 1402).

As described above, according to the one or more of the above exemplary embodiments, a cloud server-based image processing method may be performed using a system including an actual terminal that has relatively low throughput or processing power, but can be driven in real time, and a cloud server that is limited in terms of the speed of data transmission, but has higher throughput or processing power than that of the image processing terminal.

Thus, functions of a virtual terminal may be performed by an actual terminal and a cloud server in a distributed manner, based on the processing performances of the actual terminal and the cloud server, thereby efficiently capturing an image or viewing a captured image. Also, high-performance and various functions may be provided to a user based on functions of the cloud server without increasing the complexity of the terminal.

In particular, a cloud server according to an exemplary embodiment is capable of learning a user's preference based on various information received from a terminal and thus supporting various image processings.

The methods according to the above exemplary embodiments may be embodied as a program that is executable by a computer or processor and stored in a computer readable recording medium. Program commands, data files, data structures, or combinations thereof may be stored in the computer readable recording medium. The program commands recorded on the computer readable recording medium may be specially designed or may be well known to technicians in the field of computer software. Examples of the computer readable recording medium include magnetic media (e.g., hard disks, floppy disks, and magnetic tapes), optical media (e.g., CD-ROMs and DVDs), magneto-optical media (e.g., floptical disks), and hardware devices specially configured to store and execute a program command (e.g., ROMs, RAMs, and flash memories). Examples of the program command include not only mechanical language code formed by, for example, a compiler, but also high-level language code that can be executed by a computer through an interpreter or the like.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. A server-based image processing method performed by an image processing terminal, the method comprising:
   determining whether an image processing function is to be performed in real time;
   comparing, based on the determination of whether the image processing is to be performed in real time indicating the image processing function is to be performed in real time, an expected processing time of the image processing terminal and an expected processing time of the server with respect to the image processing function;
   determining, based on the determination of whether the image processing is to be performed in real time indicating the image processing function is not to be performed in real time, a processing performance of the image processing terminal;
   determining whether an image processing function is to be performed by the image processing terminal or a server based on the determination of whether the image processing is to be performed in real time and at least one among the comparing and the determination of the processing performance of the image processing terminal; and
   controlling at least one of the image processing terminal and the server to perform the image processing function, based on the determination of whether the image processing function is to be performed by the image processing terminal or the server,
   wherein, in response to determining that the image processing function is to be performed by the server, data and a request signal related to the image processing function are transmitted to the server.

2. The server-based image processing method of claim 1, wherein the determining whether the image processing function is to be performed by the image processing terminal or the server comprises:
   determining the processing performance of the image processing terminal; and
   determining whether the image processing function is to be performed by the image processing terminal or the server, according to the determined processing performance of the image processing terminal.

3. The server-based image processing method of claim 1, wherein the determining whether the image processing function is to be performed by the image processing terminal or the server comprises:
   comparing the expected processing time of the image processing terminal and the expected processing time of the server with respect to the image processing function; and
   determining whether the image processing function is to be performed by the image processing terminal or the server, based on a result of the comparing.

4. The server-based image processing method of claim 1, wherein the determining whether the image processing function is to be performed by the image processing terminal or the server comprises:
   in response to the image processing function being a function of processing an image to have a first resolution, determining that the function is to be performed by the image processing terminal, and in response to the image processing function being a function of processing an image to have a second resolution that is higher than the first resolution, determining that the function is to be performed by the server.

5. The server-based image processing method of claim 4, wherein the determining whether the image processing function is to be performed by the image processing terminal or the server comprises:
   in response to the image processing function being a function of processing the data into multiple image files having various resolutions, determining that the function is to be performed by the server.

6. The server-based image processing method of claim 1, wherein the request signal comprises information indicating whether the image processing function is to be performed in real time.

7. The server-based image processing method of claim 1, wherein the data comprises full-resolution raw image data or region-of-interest data.

8. The server-based image processing method of claim 1, wherein the determining whether the image processing function is to be performed by the image processing terminal or the server comprises:
   in response to the image processing function being a function of displaying a screen-nail image, determining that the function is to be performed by the image processing terminal, and in response to the image processing function being a function of transmitting a zoom region of the displayed screen-nail image to the image processing terminal, determining that the function is to be performed by the server.

9. The server-based image processing method of claim 1, further comprising receiving processed image data from the server.

10. The server-based image processing method of claim 1, wherein the determining whether the image processing function is to be performed by the image processing terminal or the server comprises:
in response to the image processing function being a function of sharing an image stored in the image processing terminal with another device, determining that the function is to be performed by the image processing terminal, and in response to the image processing function being a function of sharing an image stored in the server with an other device, determining that the function is to be performed by the server.

11. The server-based image processing method of claim 10, wherein the controlling at least one of the image processing terminal and the server to perform the image processing function comprises:
in response to the image processing function being the function of sharing an image stored in the server with the other device, controlling the server to perform the function of sharing the image stored in the server with the other device.

12. The server-based image processing method of claim 1, wherein the controlling of at least one of the image processing terminal and the server to perform the image processing function comprises controlling the image processing terminal and the server to encode a video through temporal or spatial scalability.

13. The server-based image processing method of claim 12, wherein the determining whether the image processing function is to be performed by the image processing terminal or the server comprises:
in response to the image processing function being a function of encoding information having a first resolution, determining that the function is to be performed by the image processing terminal, and in response to the image processing function being a function of encoding information having a second resolution that is higher than the first resolution, determining that the function is to be performed by the server.

14. The server-based image processing method of claim 12, wherein the controlling of at least one of the image processing terminal and the server to perform the image processing function comprises controlling at least one of the image processing terminal and the server to decode the encoded video through temporal or spatial scalability.

15. A non-transitory computer readable recording medium having recorded thereon a program for performing claim 1.

16. A server-based image processing terminal comprising:
a controller configured to determine whether an image processing function is to be performed in real time, compare, based on the determination of whether the image processing is to be performed in real time indicating the image processing function is to be performed in real time, an expected processing time of the image processing terminal and an expected processing time of the server with respect to the image processing function, determine, based on the determination of whether the image processing is to be performed in real time indicating the image processing function is not to be performed in real time, a processing performance of the image processing terminal, determine whether the image processing function is to be performed by an image processing terminal or a server based on the determination of whether the image processing function is to be performed in real time and at least one among the comparing and the determination of the processing performance of the image processing terminal, control at least one of the image processing terminal and the server to perform the image processing function, based on the determination of whether the image processing function is to be performed by the image processing terminal or the server, and in response to determining that the image processing function is to be performed by the server, transmit data and a request signal related to the image processing function to the server.

17. The server-based image processing terminal of claim 16, wherein the controller is further configured to determine the processing performance of the image processing terminal, and determine whether the image processing function is to be performed by the image processing terminal or the server, according to the determined processing performance of the image processing terminal.

18. The server-based image processing terminal of claim 16, wherein the controller is further configured to compare the expected processing time of the image processing terminal and the expected processing time of the server with respect to the image processing function, and determine whether the image processing function is to be performed by the image processing terminal or the server, based on a result of the comparison, and
wherein the server is connected to the image processing terminal via a network.

19. The server-based image processing terminal of claim 16, wherein the controller is further configured to, in response to the image processing function being a function of processing an image to have a first resolution, determine that the function is to be performed by the image processing terminal, and in response to the image processing function being a function of processing an image to have a second resolution that is higher than the first resolution, determine that the function is to be performed by the server.

20. A server-based image processing system comprising:
an image processing terminal comprising:
a controller configured to determine whether an image processing function is to be performed in real time, compare, based on the determination of whether the image processing is to be performed in real time indicating the image processing function is to be performed in real time, an expected processing time of the image processing terminal and an expected processing time of the server with respect to the image processing function, determine, based on the determination of whether the image processing is to be performed in real time indicating the image processing function is not to be performed in real time, a processing performance of the image processing terminal, determine whether an image processing function is to be performed by the image processing terminal or a server based on the determination of whether the image processing function is to be performed in real time and at least one among the comparing and the determination of the processing performance of the image processing terminal, and transmit data and a request signal related to the image processing function to the server in response to a determination that the image processing function is to be performed by the server; and a cloud server configured to receive the data and the related signal and perform the image processing function that is to be performed based on the server.

21. An image processing method comprising:
obtaining by a terminal raw image data having a raw image data resolution;
determining whether an image processing function is to be performed in real time;
comparing, based on the determination of whether the image processing is to be performed in real time indicating the image processing function is to be performed in real time, an expected processing time of the image processing terminal and an expected processing time of the server with respect to the image processing function;
determining, based on the determination of whether the image processing is to be performed in real time indicating the image processing function is not to be performed in real time, a processing performance of the image processing terminal;
processing by the terminal the raw image data into a locally processed image;
transmitting the raw image data and an advanced processing request from the terminal to the server based on the determination of whether the image processing function is to be performed in real time and at least one among the comparing and the determination of the processing performance of the image processing terminal; and
receiving a portion of a remotely processed image corresponding to the transmitted raw image data from the server via the established communication link.

22. The image processing method of claim 21, further comprising:
estimating a local processing time for the terminal to fulfill the advanced processing request;
estimating a remote processing time for the server to fulfill the advanced processing request; and
determining, based on the local processing time and the remote processing time, whether to perform the advanced processing locally on the terminal or remotely on the server.

23. The image processing method of claim 22, wherein the remote processing time includes a network transmission time and a network receiving time.

24. The image processing method of claim 21, wherein the locally processed image is a thumbnail image having a thumbnail resolution, and the remotely processed image is a full-resolution image having the raw image data resolution.

25. The image processing method of claim 21, wherein the advanced processing request is at least one of noise reduction, gamma correction, color filter array interpolation, color correction, color enhancement, which balance control, brightness smoothing, and color shading.

* * * * *